United States Patent
Khac

(10) Patent No.: US 6,419,863 B1
(45) Date of Patent: Jul. 16, 2002

(54) METHOD OF MOULDING FILLINGS AND SEATS COMPRISING SUCH FILLINGS

(75) Inventor: Tham Vu Khac, Etampes (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/411,172

(22) Filed: Oct. 1, 1999

(30) Foreign Application Priority Data

Oct. 5, 1998 (FR) .............................................. 98 12436

(51) Int. Cl.[7] .............................................. B29C 67/00
(52) U.S. Cl. ...................... 264/46.6; 264/255; 264/309; 297/DIG. 1
(58) Field of Search ............................... 264/46.6, 46.4, 264/45.1, 255, 309; 297/DIG. 1, DIG. 2, 452.27

(56) References Cited

U.S. PATENT DOCUMENTS

| | | | |
|---|---|---|---|
| 3,845,183 A | * | 10/1974 | Harrison |
| 4,239,564 A | * | 12/1980 | Krumweide |
| 4,923,653 A | * | 5/1990 | Matsuura et al. |
| 5,662,996 A | | 9/1997 | Jourquin et al. ......... 428/318.8 |
| 5,738,810 A | * | 4/1998 | De Filippo |
| 5,840,225 A | * | 11/1998 | Kikuchi et al. |
| 6,093,351 A | * | 7/2000 | Ogawa et al. |
| 6,226,819 B1 | * | 5/2001 | Ogawa et al. |

FOREIGN PATENT DOCUMENTS

| | | |
|---|---|---|
| DE | 20 35 489 A | 1/1971 |
| FR | 2.056.299 | 6/1970 |
| WO | 93/23237 A | 11/1993 |

OTHER PUBLICATIONS

French Preliminary Search Report, May 26, 1999.

* cited by examiner

*Primary Examiner*—Milton Nelson, Jr.
(74) *Attorney, Agent, or Firm*—Marshall, Gerstein & Borun

(57) ABSTRACT

A method of manufacturing a filling for a seat consists in spraying a first polyurethane foam compound into a central part of a base of a mould, leaving the first foam compound to expand naturally so as to form a skin in contact with the air, injecting a second foam compound directly in contact with the skin and closing the mould, then allowing the second foam compound to expand, the first and second foam compounds being flexible foams.

10 Claims, 2 Drawing Sheets

METHOD OF MOULDING FILLINGS AND SEATS COMPRISING SUCH FILLINGS

FIELD OF THE INVENTION

The present invention relates to a method of manufacturing fillings or paddings, designed in particular for the seats of motor vehicles.

BACKGROUND OF THE INVENTION

Such fillings generally consists of two or more layers of foam having different flexibility characteristics in order to ensure that passengers using the seats containing this filling are comfortable.

Methods of manufacturing fillings are known, in particular from FR-A-2 607 061, which consist in injecting several foams of different flexibility into a mould in succession. The foams are injected one after the other without being separated. This method has a disadvantage in that it is difficult to control the distribution of the foam layers in the mould with the result that a filling is obtained in which the different parts are of a flexibility that is not adapted to passenger comfort.

Document FR-A-2 722 726 also discloses a method of manufacturing fillings in which foams of different flexibility are successively injected into a mould, these foams being separated by an articulated element. However, although this method is entirely satisfactory as regards producing a filling that is comfortable for the passenger, it is expensive and the foam is at risk from tearing during the moulding process.

SUMMARY OF THE INVENTION

The objective of the present invention is to overcome the above-mentioned disadvantages by proposing a method of manufacturing a filling which has several layers of foam of differing flexibility in a single moulding process, without the need for an insert, whilst controlling the distribution of the foam and, in doing so, producing a very good finish.

To this end, the invention proposes a method of manufacturing a filling by introducing at least two layers of polyurethane foam into a mould, the filling comprising at least one bearing face and one supporting face opposing the bearing face and the mould having a base and a cover which match the shapes of the faces of said filling, the method comprising steps which consist in:

introducing a first flexible foam compound at least into a central part of the base of the mould;

allowing the first foam compound to expand naturally so as to form a skin in contact with the air; and introducing a second flexible foam compound in direct contact with the skin formed by the first foam compound and closing the mould; and allowing the second foam compound to expand so that the foam occupies the entire volume of the mould, and being essentially characterised in that this step by which the first foam compound is introduced consists of a spraying process and the step by which the second foam compound is introduced consists of an injection process.

The manufacturing method proposed by the invention may optionally also incorporate one or several of the following features:

the quantity of the first foam compound injected is such that after the expansion step, the skin obtained is substantially smaller in thickness than the overall thickness of the filling and is between approximately 0.5 and 50 mm;

the spraying step consists in spraying a mixture of isocyanate and polyol formulated at a pressure of between 60 and 250 bar and at a temperature ranging between 200° C. and 100° C.;

the formulated polyol comprises a mixture of water varying from 1 to 5 parts, gel catalyst varying from 0 to 4 parts, gas catalyst varying from 0 to 4 parts, cell opener varying from 0 to 5 parts and stabiliser varying from 0 to 2 parts; and prior to the step at which the first foam compound is introduced into the mould, a finishing cover is placed in the base of the mould.

Another objective of the invention is a filling produced by the above-mentioned method, in which the skin formed by the first foam compound is of a thickness substantially smaller than the overall thickness of the filling.

By preference, the hardness of the skin is between 1 and 12 kPa and the hardness of the layer corresponding to the second foam compound is between 2 and 15 kPa.

Even more preferably, the flexibility of the second foam compound is lower than the flexibility of the first foam compound.

Another objective of the present invention is to provide a seat comprising such a filling.

BRIEF DESCRIPTION OF THE DRAWINGS

Two examples of embodiments of the invention will now be described with reference to the appended drawings, in which.

MORE DETAILED DESCRIPTION

Figure 1:
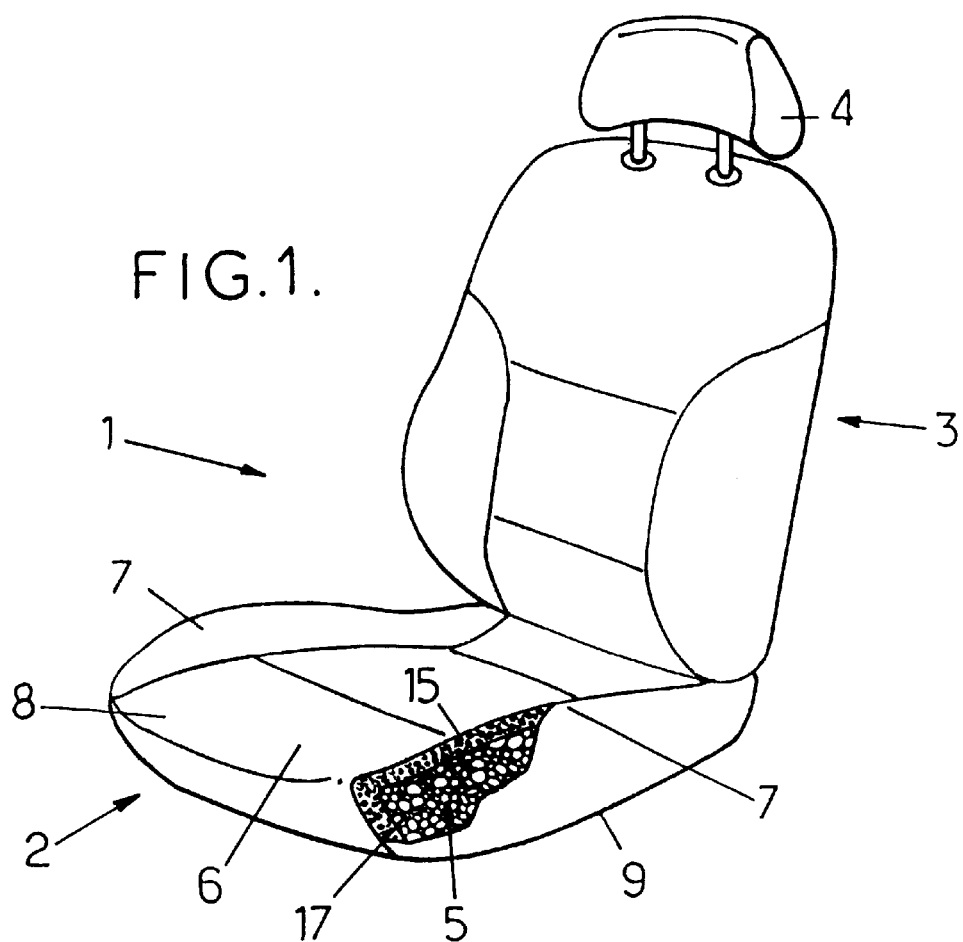
FIG. 1 is a perspective view of a seat incorporating a seat back filling and a seat proper filling produced using the method proposed by the invention.
Figure 2:
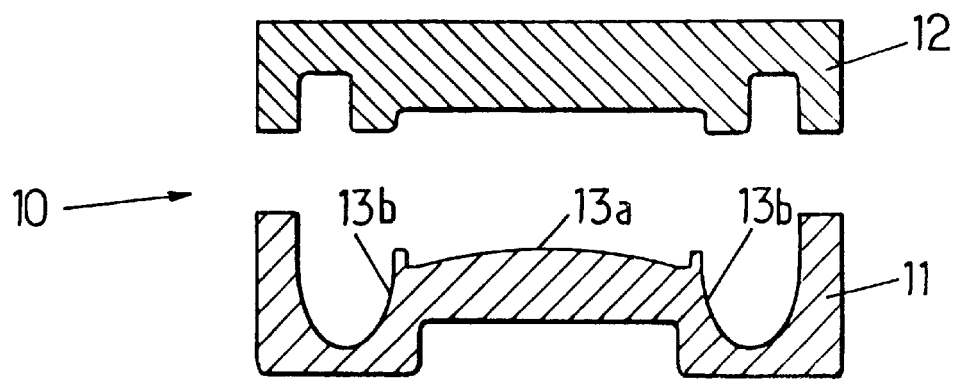
FIG. 2 is a view in cross-section of the base and cover of the mould used in the method proposed by the invention.

FIG. 1 illustrates an example of a seat 1 for a motor vehicle. In a known manner, this seat consists of a seat proper 2, a seat back 3 supported by the seat proper 2 and a head-rest 4 mounted on top of the seat back. The seat proper 2 and the seat back 3 each have a filling or padding 5 which is provided with a front bearing face 8 designed to provide comfortable seating for a passenger and a rear support face 9 opposing the front face.

The filling 5 is made up of a central part 6 and side ridges 7. This filling is produced by introducing several layers of foams of differing flexibility into a mould 10 such as that illustrated in FIGS. 2 to 5.

The mould 10 consists of a base 11 and a cover 12, the interior shapes of which match the shapes of the front 8 and rear 9 faces of the filling 5. In particular, the base 11 has a central part 13a of a shape complementing that of the central part 6 of the filling 5 as well as recesses 13b of a shape complementing that of the ridges 7 to be produced.

Figure 3:
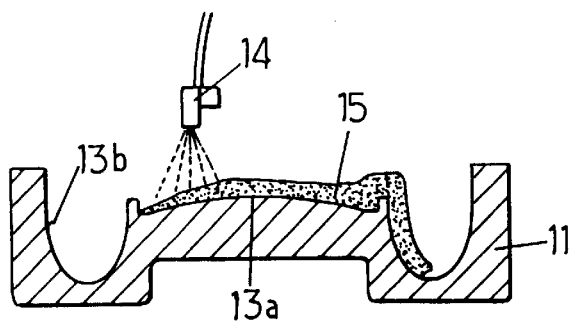
FIG. 3 is a view in cross-section of the base of the mould during the spraying step.
Figure 4:
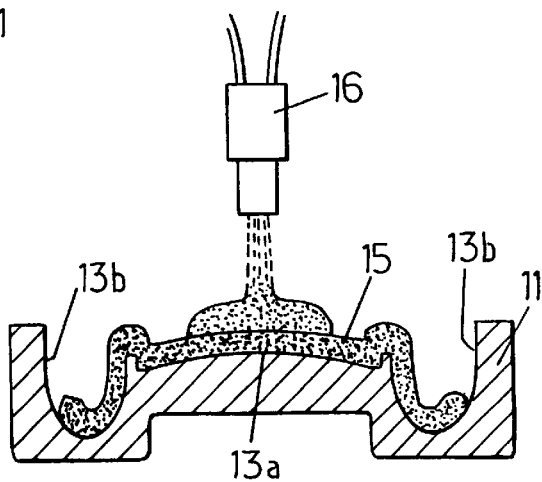
FIG. 4 is a view in cross-section of the base of the mould during the injection step.
Figure 5:
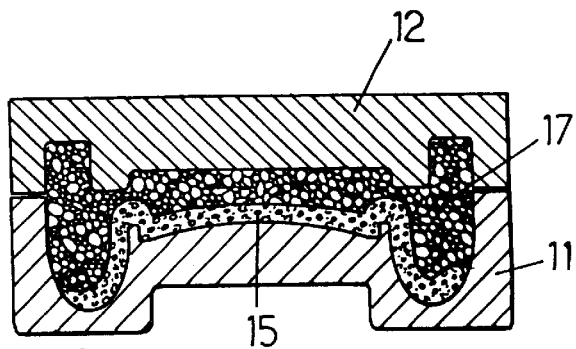
FIG. 5 is a view in cross-section of the mould after injection.

The method proposed by the invention is more specifically illustrated in FIGS. 3 to 5. It consists in introducing two polyurethane foam compounds into the mould 10 in succession without using an additional insert or articulated elements.

The first step of the method, illustrated in FIG. 3, consists in spraying a first flexible foam compound into the base 11 of the mould 10 by means of a nozzle 14, so as to obtain a first layer of flexible polyurethane 15.

The nozzle 14 belongs to a machine for spraying a mixture of two components, at a pressure in the order of 60 to 250 bar and at a temperature varying from 200° C. to 100° C. The first foam compound consists of a formulated mixture of isocyanate and polyol. The polyol used consists of a mixture of water, the quantity of which varies from 1 to 5 parts, catalyst in the form of a gel varying from 0 to 4 parts, a catalyst in the form of a gas varying from 0 to 4 parts, a cell opener varying from 0 to 5 parts and a stabiliser varying from 0 to 2 parts.

This first compound is sprayed into direct contact with the base 11 of the mould 10, onto the surface of the central part 13a and a fraction of the surface of the recesses 13b.

The method then consists in allowing the foam injected in this manner to expand in the open air. Foaming is generated by a chemical reaction between the isocyanate and the formulated polyol. The expansion time varies from 5 seconds to 2 minutes whilst the layer obtained is of a thickness ranging between approximately 0.5 mm and 50 mm, has a mass by volume which varies between 20 kg/m$^3$ and 90 kg/m$^3$ and a hardness ranging between 1 and 12 kPa.

This causes a skin to form, the flexibility of which will depend on the type and respective proportions of polyol and isocyanate used, as well as the quantity of water and catalysts used. Formed in this way, the skin is flexible enough to impart a feeling of comfort to the user of the seat.

Once the first layer has finished foaming, a second polyurethane foam compound is then injected, in direct contact with the formed skin 15, into the base 11 of the mould (FIG. 4), by means of an injection nozzle 16. The mould is then immediately closed by fitting on the cover 12. The second foam compound will polymerise in the mould 10 filled in this manner, producing a second layer 17 of a different flexibility from that of the skin 15 (FIG. 5). The layer obtained has a volume by mass which varies from 20 kg/m$^3$ and 90 kg/m$^3$ and a hardness ranging between 2 and 15 kPa.

The second layer 17 is of a substantially greater thickness than that of the skin 15 and preferably of a lower flexibility than that of the first layer so that a filling 5 is obtained which is characterised by good contact comfort whilst providing effective support for the passenger seated in the seat having such a filling.

When removed from the mould, the filling 5 has a faultless surface finish.

Figure 6:
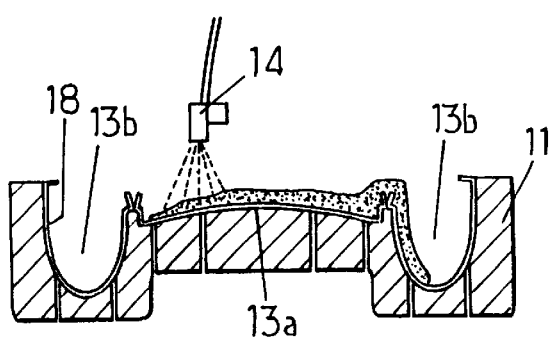
FIG. 6 is a view in cross-section of the base of the mould used for the second embodiment of a filling proposed by the invention.

Furthermore, in a second embodiment illustrated in FIG. 6, a finishing cover 18 made from a foamed fabric for example, can be placed in the base 11 of the mould prior to spraying the first foam compound. The first sprayed compound has the advantage of requiring only a single finishing cover since this cover will not naturally be penetrated by this compound.

What is claimed is:

1. A method as claimed in which the quantity of the first foam compound sprayed is such that the skin obtained after the expansion step is of a substantially smaller thickness than the overall thickness of the filling and is within the range of between approximately 0.5 and 50 mm.

2. A method of manufacturing a filling, in particular for a seat of a motor vehicle, by introducing at least two polyurethane foam compounds into a mould, the filling comprising at least a bearing face and a support face opposing the bearing face, and the mould having a base and a cover which match the shapes of the faces of said filling, the method comprising the steps of:

introducing a first flexible foam compound at least into a central part of the base of the mould;

allowing the first foam compound to expand naturally to form a skin in contact with the air;

introducing a second flexible foam compound directly in contact with the skin formed by the first foam compound and closing the mould; and allowing the second foam compound to expand so that the foam occupies the entire volume of the mould, wherein the step whereby the first foam compound is introduced comprises a spraying process, and the step by which the second foam compound is introduced comprises an injection process, and wherein the spraying step includes spraying a formulated mixture of isocyanate and polyol at a pressure ranging between 60 and 250 bar and at a temperature ranging between 20° C. and 100° C.

3. A method as claimed in claim 2, wherein prior to the step at which the first foam compound is introduced into the mould, a finishing cover is placed in the base of the mould.

4. A method as claimed in claim 2, in which the formulated polyol comprises a mixture of water varying from 1 to 5 parts, a gel catalyst ranging from 0 to 4 parts, a gas catalyst ranging from 0 to 4 parts, cell opener varying from 0 to 5 parts and stabiliser varying from 0 to 2 parts.

5. A method of manufacturing a filling, in particular for a seat of a motor vehicle, by introducing at least two polyurethane foam compounds into a mould, the filling comprising at least a bearing face and a support face opposing the bearing face, and the mould having a base and a cover which match the shapes of the faces of said filling, the method comprising the steps of:

introducing a first flexible foam compound at least into a central part of the base of the mould;

allowing the first foam compound to expand naturally to form a skin in contact with the air;

introducing a second flexible foam compound directly in contact with the skin formed by the first foam compound and closing the mould; and allowing the second foam compound to expand so that the foam occupies the entire volume of the mould, wherein the step whereby the first foam compound is introduced comprises a spraying process and the step by which the second foam compound is introduced comprises an injection process, and wherein the skin has a hardness which is within a range between 1 and 12 kPa and the second foam compound has a hardness which is within a range between 2 and 15 kPa.

6. A filling obtained in accordance with claim 5, in which the skin formed by the first foam compound is of a substantially smaller thickness than the overall thickness of the filling.

7. A filling as claimed in claim 6, in which the skin has a hardness which is within a range between 1 and 12 kPa and the second foam compound has a hardness which is within a range between 2 and 15 kPa.

8. A filling obtained as claimed in claim 7, in which the flexibility of the second foam compound is lower than the flexibility of the first foam compound.

9. A seat comprising a filling obtained as claimed in claim 8.

10. A method according to claim 5, wherein the second foam compound is less flexible than the first foam compound.

* * * * *